(12) United States Patent
Stark et al.

(10) Patent No.: US 11,212,575 B2
(45) Date of Patent: *Dec. 28, 2021

(54) METHODS AND APPARATUS FOR INITIATING A PLAYBACK PAUSE OPERATION ON ONE DEVICE AND RESUMING PLAYBACK ON ANOTHER PLAYBACK DEVICE

(71) Applicant: Time Warner Cable Enterprises LLC, St. Louis, MO (US)

(72) Inventors: James Stark, Broomfield, CO (US); Tracy Elliott, Coppell, TX (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/860,433

(22) Filed: Jan. 2, 2018

(65) Prior Publication Data

US 2018/0146241 A1   May 24, 2018

Related U.S. Application Data

(63) Continuation of application No. 15/153,003, filed on May 12, 2016, now Pat. No. 9,860,590.

(51) Int. Cl.
*H04N 21/433* (2011.01)
*H04N 21/2747* (2011.01)
(Continued)

(52) U.S. Cl.
CPC ....... *H04N 21/433* (2013.01); *H04N 21/2387* (2013.01); *H04N 21/23113* (2013.01);
(Continued)

(58) Field of Classification Search
CPC .......... H04N 21/433; H04N 21/47202; H04N 21/2387; H04N 21/4325; H04N 21/4363;
(Continued)

(56) References Cited

U.S. PATENT DOCUMENTS 8,325,673 B1 * 12/2012 McQuaide, Jr. ..... H04N 21/436
370/331
2006/0020971 A1 * 1/2006 Poslinski ........... H04N 5/44543
725/44

(Continued)

*Primary Examiner* — Omar S Parra
(74) *Attorney, Agent, or Firm* — Straub & Straub; Michael P. Straub; Stephen T. Straub

(57) ABSTRACT

Methods and apparatus that support implementing a pause, e.g., of a broadcast, on a device, recording the paused program and resuming playback of the paused program on a device associated with a user's account, are described. The pause function allows a user to pause a broadcast on a device and initiate recording of the paused program, e.g., to network storage. The pause initiating device displays a pause indicator indicating that the program output has been paused. A user logging into the user's account from a device other than the device from which the pause was initiated is presented an opportunity to resume the paused playback. Playback is resumed from the pause point on the playback device from which a resume signal is received. Upon resumption of playback on a device other than the device from which the pause was initiated, the pause indicator on the pause initiating device is removed.

20 Claims, 7 Drawing Sheets

(51) Int. Cl.
  *H04N 21/472* (2011.01)
  *H04N 21/231* (2011.01)
  *H04N 21/436* (2011.01)
  *H04N 21/4363* (2011.01)
  *H04N 21/2387* (2011.01)
  *H04N 21/432* (2011.01)

(52) U.S. Cl.
  CPC ....... *H04N 21/2747* (2013.01); *H04N 21/436* (2013.01); *H04N 21/4325* (2013.01); *H04N 21/4333* (2013.01); *H04N 21/4363* (2013.01); *H04N 21/43622* (2013.01); *H04N 21/47202* (2013.01); *H04N 21/47217* (2013.01)

(58) Field of Classification Search
  CPC ........... H04N 21/43622; H04N 21/436; H04N 21/47217; H04N 21/2747; H04N 21/4333; H04N 21/23113
  See application file for complete search history.

(56) References Cited

U.S. PATENT DOCUMENTS

| | | | |
|---|---|---|---|
| 2006/0130116 A1* | 6/2006 | Shi | H04N 5/76 725/134 |
| 2006/0282548 A1* | 12/2006 | Yoshida | G06Q 10/10 710/1 |
| 2007/0047902 A1* | 3/2007 | Ito | H04N 5/765 386/231 |
| 2007/0157235 A1* | 7/2007 | Teunissen | H04N 5/50 725/38 |
| 2010/0251318 A1* | 9/2010 | Simoes Rodrigues | H04N 1/00214 725/114 |
| 2010/0329645 A1* | 12/2010 | Sakamoto | H04N 5/76 386/297 |
| 2011/0109801 A1* | 5/2011 | Thomas | H04N 5/44 348/565 |
| 2011/0191801 A1* | 8/2011 | Vytheeswaran | H04N 7/10 725/34 |
| 2011/0320626 A1* | 12/2011 | Wong | H04N 21/41407 709/231 |
| 2013/0047083 A1* | 2/2013 | Sansom | H04N 7/17318 715/716 |
| 2013/0073673 A1* | 3/2013 | McMahon | H04L 67/1097 709/217 |
| 2014/0213227 A1* | 7/2014 | Rao | H04W 4/21 455/414.3 |
| 2016/0072865 A1* | 3/2016 | Kaplinger | H04L 67/06 709/213 |
| 2016/0191989 A1* | 6/2016 | Hardt | H04N 21/8547 725/25 |
| 2017/0251260 A1* | 8/2017 | Sanders | H04N 21/4668 |

* cited by examiner

300

| PAUSED PROGRAM RECORDINGS (STORED IN PAUSED PROGRAM RECORDING STORAGE) | | | DATE: 04/25/2016<br>TIME: 4:32 PM |
|---|---|---|---|
| 302<br>PROGRAM/MOVIE TITLE | 304<br>PAUSE START TIME | 306<br>RETENTION END TIME | 308<br>DEVICE ON WHICH PAUSE INITIATED |
| TITLE 005 (310) | 04/25/2016 11:33 AM | 04/26/2016 11:33 AM | DEVICE 2 |
| TITLE 009 (312) | 04/24/2016 9:20 PM | 04/25/2016 9:20 PM | DEVICE 1 |
| ⋮ | ⋮ | ⋮ | ⋮ |
| TITLE N (320) | 04/24/2016 5:40 PM | 04/25/2016 5:40 PM | DEVICE K |

| USER SELECTED PROGRAM RECORDINGS (STORED IN USER RECORDED PROGRAM STORAGE) | | | DATE: 04/25/2016<br>TIME: 4:32 PM |
|---|---|---|---|
| 402<br>PROGRAM/MOVIE TITLE | 404<br>RECORDING DATE AND/OR TIME | 406<br>RETENTION END TIME | |
| TITLE 001 (410) | 04/20/2016 | 05/05/2016 12:00 AM | |
| TITLE 002 (412) | 12/30/2015 | N/A | |
| TITLE 003 (414) | 04/25/2016 | 05/25/2016 12:00 AM | |
| ⋮ | ⋮ | ⋮ | |
| TITLE M (420) | 03/01/2016 | 05/31/2016 12:00 AM | |

FIG. 4

METHODS AND APPARATUS FOR INITIATING A PLAYBACK PAUSE OPERATION ON ONE DEVICE AND RESUMING PLAYBACK ON ANOTHER PLAYBACK DEVICE

RELATED APPLICATIONS

The present application is a continuation of U.S. patent application Ser. No. 15/153,003 filed on May 12, 2016, which is hereby expressly incorporated by reference in its entirety.

FIELD OF THE INVENTION

The present invention relates to content delivery and playback methods and apparatus and, more particularly, to methods and apparatus that support implementing multi-device pause function.

BACKGROUND OF THE INVENTION

Video service subscribers normally have multiple playback devices. While multiple devices maybe associated with a content delivery account, which device an individual uses at a given time often depends on the user's location.

With some device based pause operations, a user may pause a broadcast on a device with the broadcast content being stored in a local content buffer for some time allowing the user to resume playback of the paused content. Unfortunately, such a local content buffer is normally not accessible to other devices and as a result a user is normally required to resume playback of paused broadcast content from the device the pause was initiated. Also, while the device is in a pause mode, the user normally is not able to switch to other channels.

From the above it should be appreciated that there is a need for methods and/or apparatus which would allow a user to pause broadcast content on one device and resume playback on another device or the same device. While not critical or necessary in all embodiments it would be desirable if upon resumption of playback of a paused broadcast, the device from which the pause was initiated was freed to be used for normally playback.

For a variety of reasons, it is desirable that in at least some implementations the pause function be capable of being implemented based on a user controlled signal and without the need for a broadcaster to access a pre-broadcast recording of the program. In addition it is desirable in at least some embodiments, paused program content be treated differently than content selected by a user for recording in terms of content retention.

SUMMARY

Methods and apparatus that support implementing a pause, e.g., of a broadcast, on a device, recording the paused program and resuming the paused program playback on the same or a different device associated with a user's account, are described.

The pause function allows a user to initiate a pause of a broadcast, e.g., live broadcast, on one device associated with a user's account. The device will display a pause indicator indicating that the program content output has been paused. The paused program is recorded, e.g., to network storage, with the program being recorded in some embodiment from the point in time when the pause was activated till the end of the program. In various embodiments the recording of the paused program does not count against a user's recording limit, e.g., recording resource limit assigned by the service provider to the user. The user can resume the paused playback on the same device from which the pause was initiated or from a different device. A user logging into the account from a device other than the device from which the pause was initiated will be presented the option of resuming the paused playback. Playback will be resumed from the pause point on the playback device from which the resume signal is received. Upon resumption of the playback to a device other than the device from which the pause was initiated, the pause indicator on the device from which the pause was initiated will be removed and the device from which the pause was initiated will resume outputting real time content in some embodiments.

The portion of the program stored in network storage as a result of the pause is maintained for a predetermined time period, e.g. a few hours or a day which may be and often is different than the duration of the portion of the paused program which is recorded. At the expiration of the paused content retention time period the paused program will be deleted from the network storage. The pause program content retention time period and deletion is independent of and normally different than the retention and deleting time periods associated with user controlled recordings as opposed to recordings of portions of programs which occurred to support a program pause function.

In some embodiments paused program content playback can be resumed to at most one device and the paused program content is deleted upon playback or reaching of the paused content retention time period. The pause methods and apparatus allow content, e.g., real time broadcasts, being viewed on one device to be resumed on the same or a different device associated with the subscriber, e.g., same account corresponding to the subscriber. The storage of paused content can be implemented in a network storage device facilitating access via a variety of networks whether they be home networks or other networks such as the Internet allowing for a wide degree of freedom. For example a user can pause live content being output on a set top box and resume playback from a remote location with the resumption being to a cell phone or other device inside or outside the home of the user who paused the original output of the broadcast or other live content.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

It should be appreciated that numerous additional variations and embodiments are possible and remain within the scope of the invention. Various additional features, embodiments and advantages of the present invention are discussed in the detailed description which follows.

BRIEF DESCRIPTION OF THE DRAWINGS

FIG. 2, which comprises a combination of FIGS. 2A, 2B, 2C and 2D, illustrates the flowchart of the exemplary method of operating a control device in accordance with an exemplary embodiment.

FIG. 3 illustrates a paused program recordings list in accordance with one embodiment of the invention.

FIG. 4 illustrates a user selected program recordings list in accordance with one embodiment of the invention.

DETAILED DESCRIPTION

Figure 1:
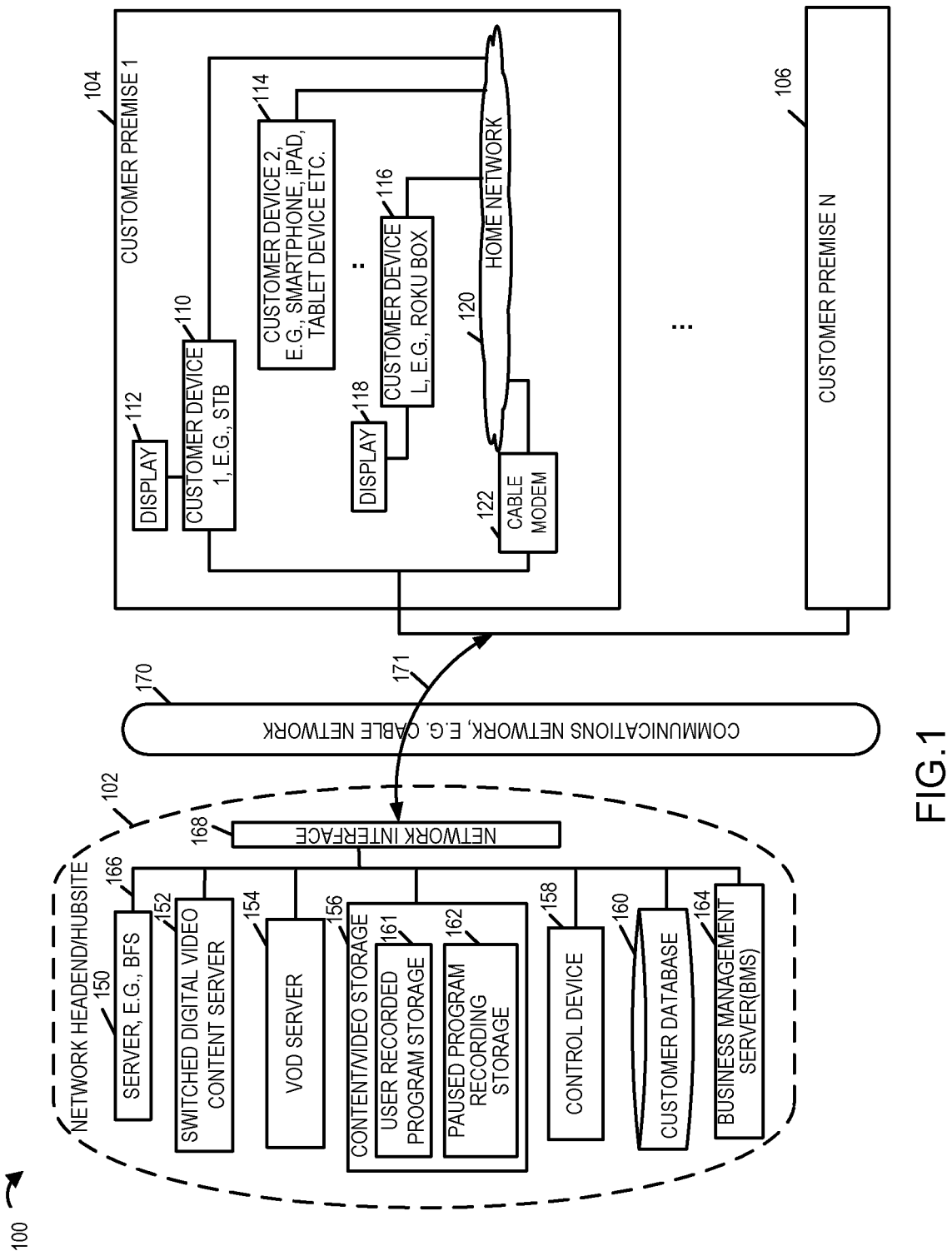
FIG. 1 illustrates an exemplary system implemented in accordance with the some embodiments of the present invention.

FIG. 1 illustrates an exemplary system 100 implemented in accordance with one exemplary embodiment of the present invention. The system 100 supports delivery of content to customer premise equipments (CPEs) including content playback devices in accordance with various embodiments of the invention. The system 100 includes a network headend 102, a communications network 170, e.g., a hybrid fiber-coaxial (HFC) network, satellite network, and/or internet, and a plurality of customer premises 104, 106. In various embodiments the content, e.g., multimedia content, is delivered from the headend 102 over the communications network 170 to one or more devices at the customer premises 104, 106 depending on the customer device capability and/or user preference. In some embodiments the customer premises 104, 106 include a variety of devices including, e.g., legacy set top box (STB) devices, switched digital video STB devices as well as IP capable devices.

The network headend 102 may be implemented at a cable network office or hubsite serving a plurality of customer premises and includes multiple servers and databases which are coupled together as shown. In the FIG. 1 example, the headend 102 includes a content broadcast server 150, e.g., a broadcast file server (BFS), a switched digital video (SDV) content server 152, a video on-demand (VOD) server 154, a content storage 156, a control server 158, a customer database 160 and a business management server 164. It should be appreciated that some of the servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a local network 166. The local network 166 is coupled via one or more network interfaces 168 to other networks and/or devices. For example, the headend 102 is coupled via network interface 168 to communications network 170, e.g., a cable network, and may also be coupled to one or more other external networks.

Via the network 170, the elements shown in the network headend 102 can send and/or exchange various information with the devices located at the customer premises 104, 106. As shown in FIG. 1, communications link 171 traversing the communications network 170 couples the CPEs at the customer premises 104, 106 to the various elements/servers shown in the network headend 102.

The content server 150, e.g., a broadcast file server (BFS), among other things, is responsible for delivering, e.g., broadcasting, content including program content and advertising content and/or other information to one or more customer devices, e.g., set top boxes, which support receiving content by tuning to, e.g., QAM broadcast stream broadcast by the server 150. The switched digital video (SDV) content server 152 provides digital content to customer devices which support receiving SDV content. The VOD server 154 is responsible for responding to on-demand requests and delivering, on-demand programming content including ordered by one or more customers and/or other information to one or more customer devices, e.g., set top boxes. In various embodiments the content servers 150, 152, and 154 access the programming content from the content storage 156 and generate transport streams suitable for delivery to various CPEs via the communications network 170.

The content storage 156 stores content, e.g., audio, video and/or other multimedia content. In some embodiments the content stream is encrypted prior to delivery to the CPEs over the communications network 170. In addition to stored content that may be provided to customer devices the content storage 156 includes a user recorded program storage 161 and a paused program recording storage 162. The user recorded programs storage 161 includes user recorded programs, e.g., on a per customer account basis for a plurality of customers and/or on a per customer device basis, e.g., with user recorded programs classified based on the user device used for recording. The paused program recording storage 162 includes paused program recordings for a plurality of customers on a per customer account basis and/or on a per customer device basis, e.g., with the paused program recordings classified based on the user device from which with which a paused program recording is associated.

The control server 158 is optionally included in the headend 102 and may reside externally. The control server 158 in some embodiments facilitates multi-device pause function implementation in accordance with the features of the present invention. In s embodiments the control server 158 is configured to initiate, in response to receiving a pause signal from a customer device, recording of a portion of a program which has been paused and was being output by the customer device prior to initiation of a pause by a user of the customer device, and provide, in response to a resume playback signal from the same or different customer device, a recording of the paused program to the requesting device. The requesting device may be different from the device which initiated the pause. In various embodiments the control server 158 manages and/or maintains the user recorded programs storage 161 and paused program recording storage 162 in accordance with the features of the present invention as discussed in more detail later.

The customer database 160 includes, for a plurality of customers, customer information, e.g., customer record/profile, customer account information and information regarding the devices installed at customer premises. Each customer record correspond to an account holder/subscriber and includes user account and devices information associated with the given customer account. In some embodiments customer account information includes, e.g., account number, subscription/service information, customer device capability and other billing related information. Customer database 160 also includes customer device information, e.g., identification and/or other information regarding customer devices such as STBs, IP capable devices such as laptops, tablets devices, Smartphones etc., and/or devices installed at various customer premises served by the headend 102. BM (Business management) server 164 processes billing information corresponding to customers serviced by the headend 102.

Referring now to the customer premises shown in system 100. Each customer premise 104, 106 may include a plurality of CPEs including playback devices. In various embodiments the CPEs located at the customer premises include, e.g., modems, routers, and playback devices including, e.g., set top box, internet capable TVs, personal computers, laptops, tablet devices, Smartphones etc. In various embodiments a content playback device presents the program content to a viewer, e.g., customer/subscriber. In various embodiments the customer devices are capable of communicating with the devices of the headend 102 over the communications network. FIG. 1 shows some details of customer premise 1 104. Customer premise N 106 may be similar to the customer premise 104 and may include similar CPEs, e.g., set top boxes and/or other playback devices.

The customer premise 104 includes a plurality of customer devices including customer device 1 110, e.g., a set top box, customer device 2 114, e.g., an IP capable devices such as a Smartphone, iPAD, tablet device etc., a customer device L 116, e.g., an IP streaming device such as ROKU box, and a cable modem 122. The various devices at the customer premise 104 are coupled to the local home network 121 over which they communicate and exchange information. While the customer devices have recording capability and memory for storage, in various embodiments a customer may decide to use service provider allocated recording storage space 161 to record and store user selected recordings. On the other hand the paused program recordings are stored in the separate storage 162 and the memory space used by a user for paused program recordings is not counted against the storage allotted to a user for user selected program recordings.

As shown, the customer device 110 is coupled to display device 112, and customer device 116 is coupled to display device 118. It should be appreciated that in some embodiments customer devices can be integrated in a device which also includes a display. The display devices could be, e.g., standard televisions. In some embodiments the customer devices, e.g., STBs, at the customer premises may include, e.g., a legacy STB, a DOCSIS (Data Over Cable Service Interface Specification) set top box, an SDV capable set top box, and/or a hybrid set top box. The SDV capable set top box devices support receiving SDV programming content from the SDV server 152 while the legacy STBs receive programming content via a QAM broadcast stream from BFS 150. In some embodiments the STB 110 is capable of receiving a broadcast stream of a program from the BFS 150 and a unicast IP stream communicating program content, e.g., from VOD server 154.

FIG. 2, which comprises a combination of FIGS. 2A, 2B, 2C and 2D, is a flowchart 200 illustrating the steps of an exemplary method of operating a control device to support a multi-device pause function, in accordance with an exemplary embodiment. In some embodiments the control device implementing the method of flowchart 200 is a network control device, e.g., control device 158 shown in FIG. 1. While shown in FIG. 1 embodiment as being located at a head end 102, the control device 158 may be located external to the service provider headend, e.g., on the customer premise side. The method starts in step 202, e.g., with the control device 158 being placed into operation. Operation proceeds from start step 202 to step 204. Operation also proceeds via connecting node D 205 to additional steps along a parallel path illustrated in FIG. 2D and discussed later.

In step 204 which is performed on an ongoing basis in some embodiments, the control device monitors for control signals from a user device, e.g., a playback device. The control signal may include a variety of different control signals, e.g., a login control signal for logging to a user account, a pause signal, a playback resume signal etc. Operation proceeds from step 204 to step 206 which is performed, e.g., in response to the control device detecting receipt of a user signal. In step 206 it is determined if a control signal has been received. If it is determined that no control signal was received the operation proceeds back to the monitoring step 204 and the device continues monitoring for control signals from playback devices. If however it is determined that a control signal is received, operation proceeds to step 208. In step 208 it is determined if a received control signal is a pause signal from a user device. If in step 208 it is determined that the received control signal is a pause signal the operation proceeds to step 210. In some embodiments during operation the control device receives a pause signal from a first playback device, e.g., STB 110. The pause signal from the first playback device is e.g., a control signal to pause, e.g., stop, output of a program being received by the first device. In some embodiments the program being received by the first playback device is a live event being broadcast in real time by the service provider system. The program may not be live event broadcast but a broadcast of a weekly program scheduled in accordance with normal broadcast schedule of the program. In some embodiments the program is a first program that was being output by the first playback device prior to initiation of a pause at the first playback device.

In step 210 the control device initiates, in response to receiving the pause signal, recording of the program for which the pause signal was received, e.g., program's output has been paused on the first playback device. It should be appreciated that while output of the program is paused on the first device initiating the pause, the program transmission, e.g., broadcast, does not stop from the service provider in some embodiments since the program is broadcast to numerous subscriber devices.

Operation proceeds from step 210 to step 212. In step 212 the control device sends a switch control signal to the first playback device from which pause signal was received to switch to a paused mode of operation. In some embodiments the switch control signal controls the first playback device to switch to the pause mode from a normal mode and stop outputting content corresponding to the first program, e.g., to a display device. In some embodiments the switch control signal controls the first playback device initiating the pause to display a pause indicator, e.g., a message indicating that playback of the first program has been paused. In some embodiments the displayed message also includes an option to resume playback. In some embodiments upon switching to a paused mode of operation the first playback device functions as if the playback device operation itself has been paused and displays the pause message. In some embodiments if a user of the first playback device changes to a different channel or mode of operation the playback device exits out of the pause mode and returns to the normal playback mode. In some embodiments upon pausing of the program the first device requesting pausing of the program relinquishes its receiver, tuner/demodulator chains and/or buffers which were being used to receive, process and buffer the content corresponding to the paused program. The relinquished resources may be used for other purposes.

Operation proceeds from step 212 to step 214. In step 214 the control device stores the recording of the paused program in a paused program storage which may be, e.g., a network based storage, e.g., cloud storage. In some embodiments initiating recording of the program includes the control device initiating recording of a portion of the program, e.g., remaining portion of the program after pause implementation. For example if the first program duration is 1 hour and prior to initiation of pause by the first playback device 20 minutes of the program has been received and/or output by the first playback device then only the remaining 40 minutes portion of the first program will be recorded. The storage of the recorded portion of the paused program does not count against the allowed network storage allocated to the first playback device and/or to the customer account associated with the first playback device. In various embodiments the paused program storage in separate from a user selected program recording storage. Operation continues in this manner as indicated by the loop back arrow from step 214 back to the steps following start operation, e.g., steps 204 and 256 (via node D).

Referring again to step 208. If in step 208 it is determined that the received control signal is not a pause signal the operation proceeds to step 216 via connecting node A 215. In step 216 it is determined if the received control signal is from a device operating in pause mode, e.g., a resume playback signal from a device in pause mode of operation. For example the control signal in step 208 may be a resume playback signal to resume playback of the paused program from the first playback device, e.g., after the first playback device initiated program pause and entered a pause mode of operation. If in step 216 it is determined that the received control signal is a resume playback signal from a device, e.g., the first playback device, operating in the pause mode the operation proceeds from step 216 to step 218. In step 218 the control device provides the recorded portion of the paused program to the requesting device, e.g., first device.

Operation proceeds from step 218 to step 220. In step 220 the control device signals the requesting device which is in paused mode of operation to switch from the paused mode to a paused program playback mode in which content corresponding to the recorded portion of the program supplied to the playback device is output, e.g., played back and displayed to a viewer. Operation proceeds from step 220 to step 222 where the control device continues outputting, e.g., supplying, the recorded portion of the paused program until end of the program or until a new user command is received. Operation proceeds from step 222 back to the steps following start of the control device operation and continuing in a similar manner.

Returning to step 216. If in step 216 it is determined that the received control signal is not signal from a device operating in the pause mode, e.g., not a resume playback signal from the first device which initiated pause of the program, the operation proceeds from step 216 to step 226. In step 226 it is determined if the received control signal is a login signal from a device which is not paused, e.g., a second playback device not operating in the pause mode of operation. In some embodiments a single customer may have numerous user devices, e.g., playback devices, associated with the customer's account. The customer and/or household members may access services from any of these associated, e.g., registered, devices by logging to the customer's account. For example a user may use a second playback device, e.g., customer device 114 of customer premise 104, to login to customer account to access subscribed services, e.g., watch TV show and/or other service. The user attempting to login may enter username and password to successfully login. If in step 226 the control device determines that the received control signal is not a login signal from a device which is not paused operation proceeds to step 227 wherein the control device implements/performs the function corresponding to the received control signal.

On the other hand if in step 226 the control device determines that the received control signal is a login signal or a request for recorded program information from a device which is not paused, e.g., the second playback device, operation proceeds from step 226 to step 228. The control signal may include username and/or password information corresponding to the customer's account and/or other information which can be used to identify a user account, such as an IP address corresponding to the user account or an account identifier. Such information maybe in addition to the user name and/or password or portion of the signal that indicates it is a request for recorded program information or a login request. In step 228, following receipt of the control signal, e.g., request for recorded program information or login signal corresponding to the identified user account, the control device identifies customer account information, e.g., a recording record and/or other information such as login information corresponding to the account and/or device from which control signal was received or the account identified based on information in or sent with the control signal. As part of step 228 or as an additional step the customer's account is accessed and information in the customer account record is retrieved for use. Identifying and/or accessing the customer account may and sometimes does include the control device accessing customer records which include customer account information, login information and associated device information, e.g., device IDs of devices associated with the customer's account. The customer records may be, and sometimes are, stored in the customer database 160 or stored within the control device 158 in some embodiments. Thus by matching the device identifier of the device and/or account information received in as part of a login attempt and/or attempt to access recorded content information corresponding to an account the information stored in the customer records maintained by the control device corresponding to the identified customer account and/or device from which the signal was received are accessed and retrieved.

Operation proceeds from step 228 to step 230. In step 230 the control device determines, e.g., based on the accessed information if there are any devices, corresponding to the identified customer account, which are in the paused mode of operation. In some embodiments this is done by checking a pause state indicator to see if it has been set to indicate that a device is currently paused. For example, in some embodiments the customer record includes an indicator for each device associated with an account. The indicator for an individual device is set to paused, or not paused, based on the state of the device to which the indicator corresponds. Different devices corresponding to a customer may be in different states, e.g. with one in a paused state while one, two or more are in a non-paused state.

If it is determined that none of the devices associated with the identified customer account are in the paused mode of operation, operation proceeds from step 230 to step 232. Thus in some embodiments when there are no devices in the paused mode corresponding to the customer's account it indicates that no paused program recording is available to playback.

In step 232 the control device sends a signal to the device from which the control signal, e.g., login signal or recorded content information request, was received, e.g., second device, to present, e.g., display on a display device, a program guide, welcome message and/or other information normally presented to a user upon login or in response to a request for recorded program information with the information provided depending on the type of signal which was received.

It should be appreciated that in some embodiments while a device may no longer be in a paused mode of operation because the playback device from which a pause signal was received powered off after a period of inactivity or because recording of the program during which the pause signal was received ended and the device was returned automatically to a normal mode of operation, paused recordings corresponding to an account may exist for a device no longer in the paused mode of operation. Such paused programs maybe identified in the signal as paused programs with other programs being indicated as recorded programs. Thus a playback device may receive paused and recorded program information in the signal sent in step 232 to the device, e.g., CPE device, from which the control signal was received. The CPE device from which the control signal was received maybe a playback device with a display, STB or some other type of CPE device. Operation proceeds from step 232 via connecting node C236 to step 238 and/or step 240.

If in step 230 it is determined that there is a device associated with the identified customer account is in the paused mode of operation, e.g., the first playback device, the operation proceeds from step 230 to step 234. In step 234 the control device sends a signal to the device from which the control signal, e.g., login signal or request for information on recorded programs was received, e.g., second device, to present an opportunity, e.g., display a prompt including pause information on a display device, to a user to resume playback of paused program(s) that was paused on one or more other devices corresponding to the identified customer account. In some embodiments presenting the opportunity to the user includes displaying a list of one or more paused programs corresponding to the identified customer account. For example a user may have paused a first program from the first playback device, e.g., STB 110. If the same or different user logged in via the second playback device, e.g., ROKU box 116, to access services then the user will be provided an opportunity to resume playback of the paused program. It should be appreciated that by providing such option, a viewer is provided a sense of multi-device pause, e.g., as if the pause was implemented across multiple devices of the user and the user may resume playback from the pause point from any of the devices in the same manner as if the pause was implemented by that device.

Thus client devices can request, e.g., from the network based control device 500 that supports a network DVR service and pause functions to receive a listing of all recorded programs corresponding to a customer account. In some embodiments if one of the recorded programs is a paused program, e.g., of a type "pause" as opposed to "DVR recording" it will be treated differently, e.g., it will be identified as a paused program rather than a recorded program. In some embodiments the control device 500 maintains information indicating which recorded programs corresponding to an account are paused programs and which programs are programs recorded as part of a normal DVR service provided to the customer to which an account corresponds. In some embodiments a "paused" indicator is associated in memory of the control device with each recording of a program resulting from a pause operation with a DVR recording indicator being associated with recorded programs which were recorded as part of a user controlled DVR recording operation. In some embodiments recorded programs without a "pause" indicator associated with them are deemed to be normal DVR related recordings. Services that calculate total storage associated with DVR records, e.g., recordings, treat the "pause" recordings differently from DVR recordings. In at least one embodiment the recordings due to one or more pause operations are not counted towards a user's data limit with regard to DVR recordings. Thus a user can pause programs without concern about the amount of storage already used for network DVR recordings.

Operation proceeds from step 234 to step 238 via connecting node C 236. In step 238, which is an optional step, a resume playback signal is received to initiate playback of one of the paused recordings. If a resume playback signal is not received within a predetermined time of step 234, 236 operation proceeds to step 240 without a resume playback of a paused recording control signal being received in step 238. Operation proceeds from step 238 to step 240 where it is determined if a resume playback signal was received from a device, e.g., second playback device, to which pause information (information presented in step 234) was provided, e.g., in a predetermined amount of time of steps 232, 240 and/or the user being provided with a list of paused recordings from which they can select to resume one or more of the paused recordings. If the resume playback signal was not received from the device, e.g., second playback device, to which pause information was presented, e.g., indicating that the device to which pause information was presented is not interested in resuming playback of paused program the operation proceeds from step 240 to step 242 where the control device sends a signal to the second device to present, e.g., display on a display device, a program guide, welcome message and/or other information normally presented in response to the user login signal or other control signal which was received.

If in step 240 it is determined that the resume playback signal was received from the second playback device to which pause information was presented the operation proceeds from step 240 to step 244. In step 244 the control device controls the device from which resume playback signal was received to resume playback of the paused program. In various embodiments step 244 includes one or both of steps 246 and 248. In step 246 the control device provides, in response to the resume playback request of the paused program, the paused program portion that has been recorded to the device from which resume playback signal was received, e.g., the second playback device. The received resume playback signal may, and normally does, identify the paused content to be played back. The portion being provided to the playback device is the recorded portion of the program that was recorded as the result of a pause command. Thus the portion is normally less than the full program since the full program is normally not recorded in response to a pause command since at the time of the pause command the program was ongoing. In some embodiments the second playback device is different from the first playback device which initiated the pause. Thus it should be appreciated that content paused by one device and recorded as part of a pause operation can be paused back on a second different device. In step 248 the control device controls the device from which resume playback signal was received to output the recorded portion of the program being provided, e.g., by sending a control signal to the second device.

Operation proceeds from step 244 to step 250. Step 250 is shown with broken lines to indicate that it is an optional step performed in some embodiments, e.g., where the resume playback signal was received from the second playback device which is different from the device that initiated the pause of the program and entered pause mode. In step 250 the control device sends a switch control signal to the playback device in paused mode of operation, e.g., first playback device, to switch from the pause mode of operation to a normal playback mode of operation. The switch control signal may be in response to resume playback signal from the second playback device and/or following resumption of playback of the paused program portion on the second playback device. In this way, in at least some embodiments, the first device from which a pause was initiated resumes normal operation when a second device resumes playback of the paused content. In some embodiments as part of step 250 of controlling the first playback device to switch to a normal mode the control device controls the first device to stop displaying the pause message, e.g., message indicating that a program and/or the device has paused as indicated by step 252. Operation from step 250 via connecting node B 224 back to the steps following the start of operation.

Figure 2A:
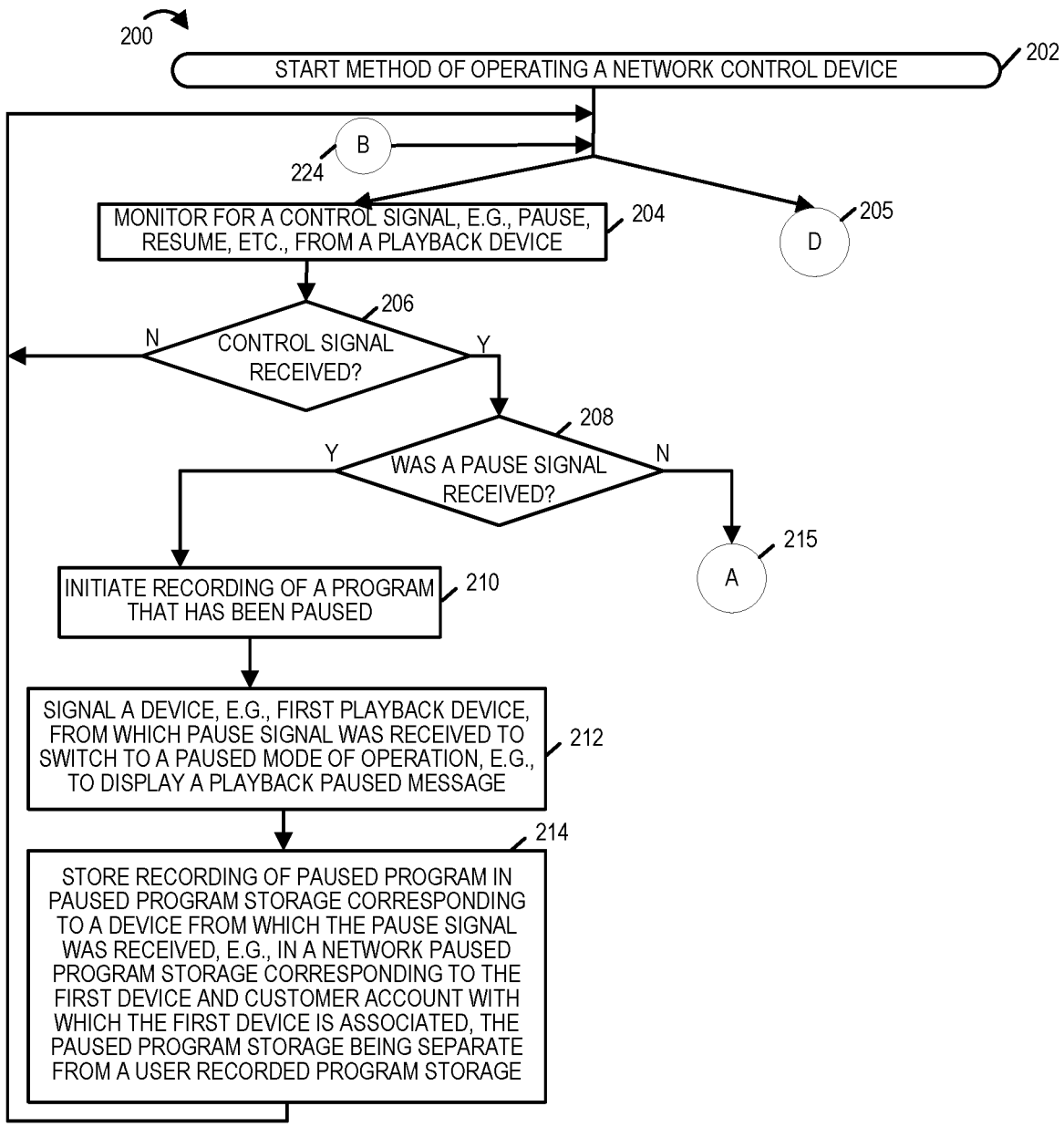
FIG. 2A is a first part of an exemplary method of operating a control device, in accordance with an exemplary embodiment implemented using the system shown in FIG. 1.
Figure 2B:
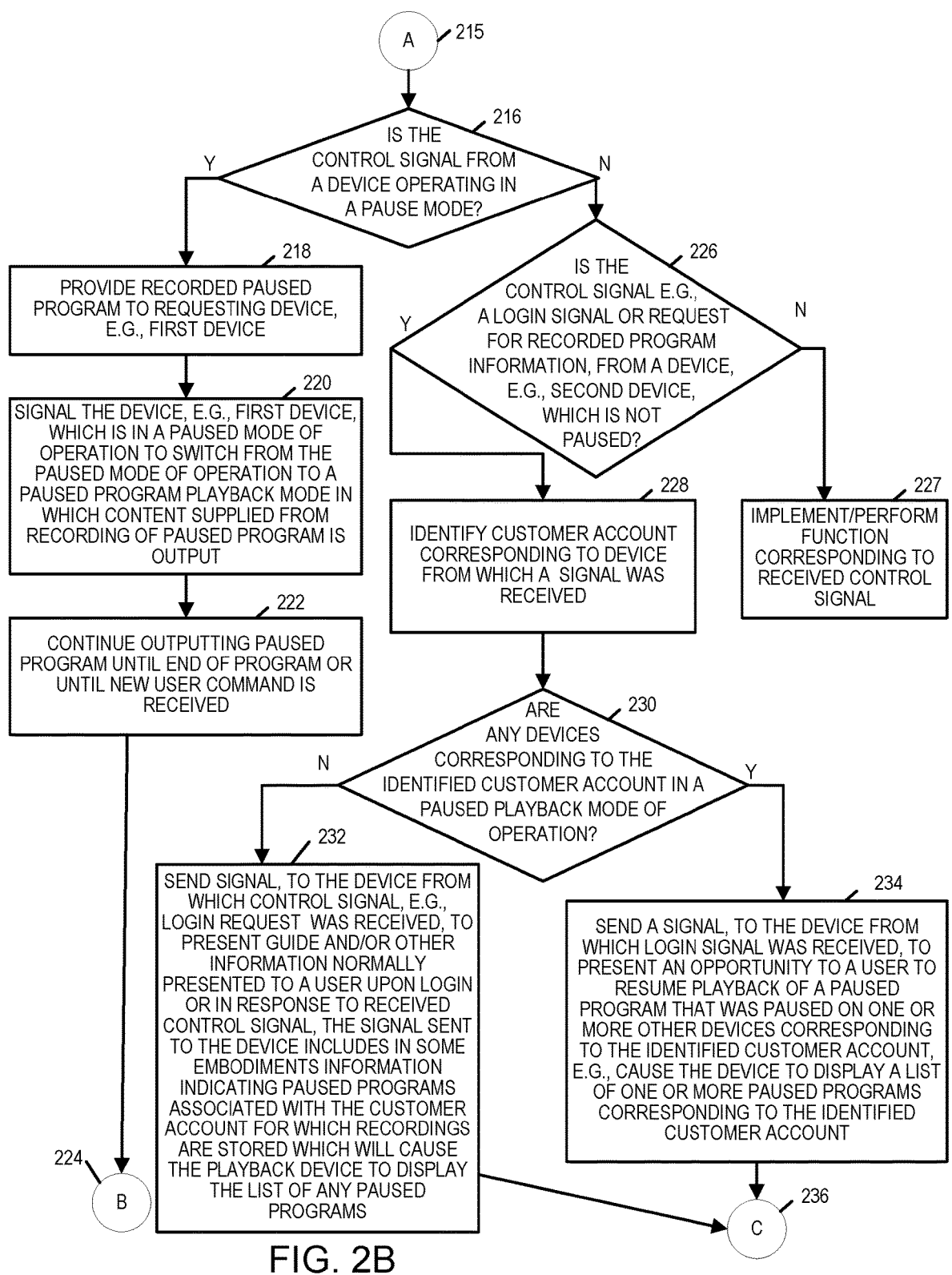
FIG. 2B is a second part of the exemplary method of operating a control device, in accordance with an exemplary embodiment.
Figure 2C:
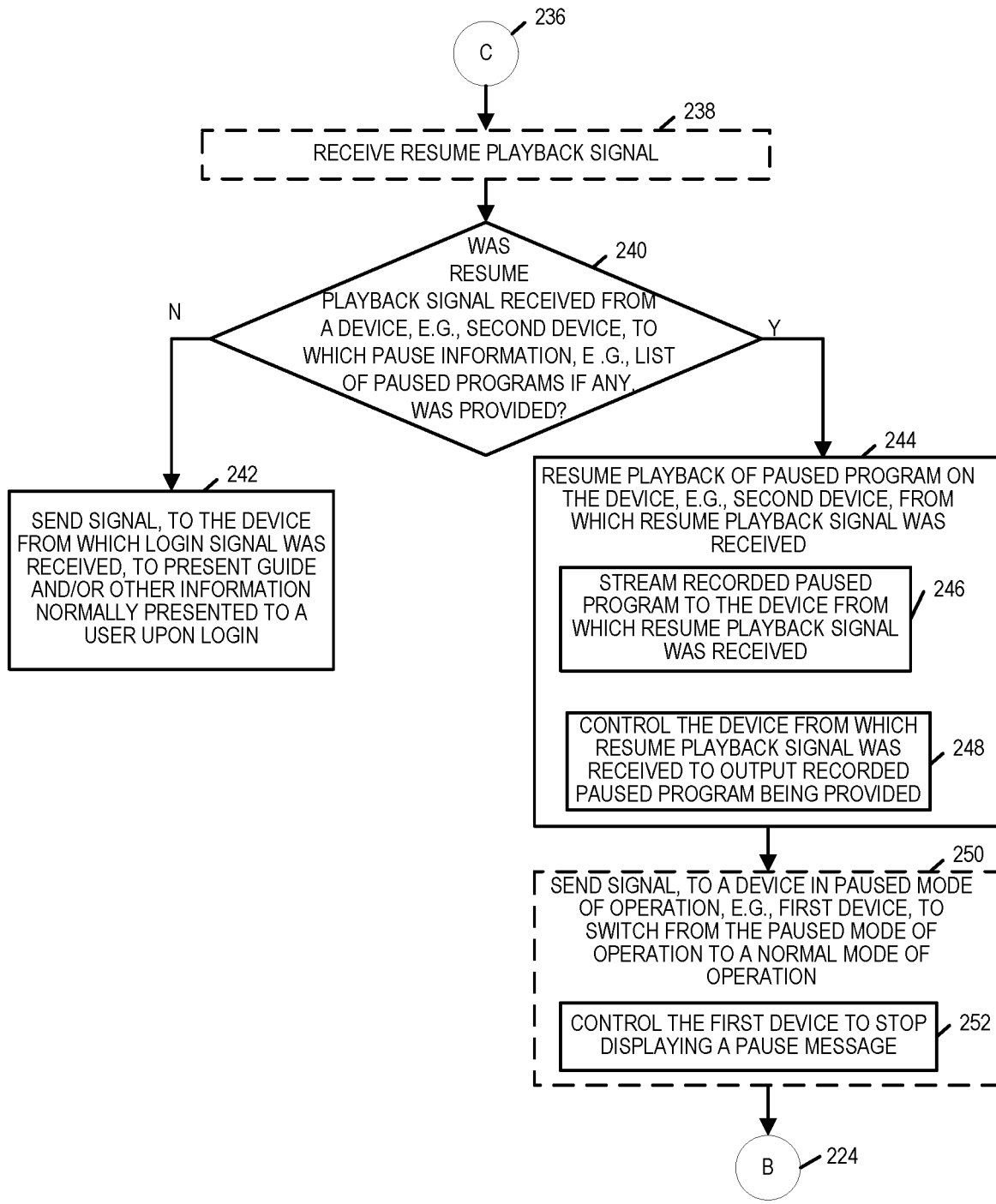
FIG. 2C is a third part of the exemplary method of operating a control device, in accordance with an exemplary embodiment.
Figure 2D:
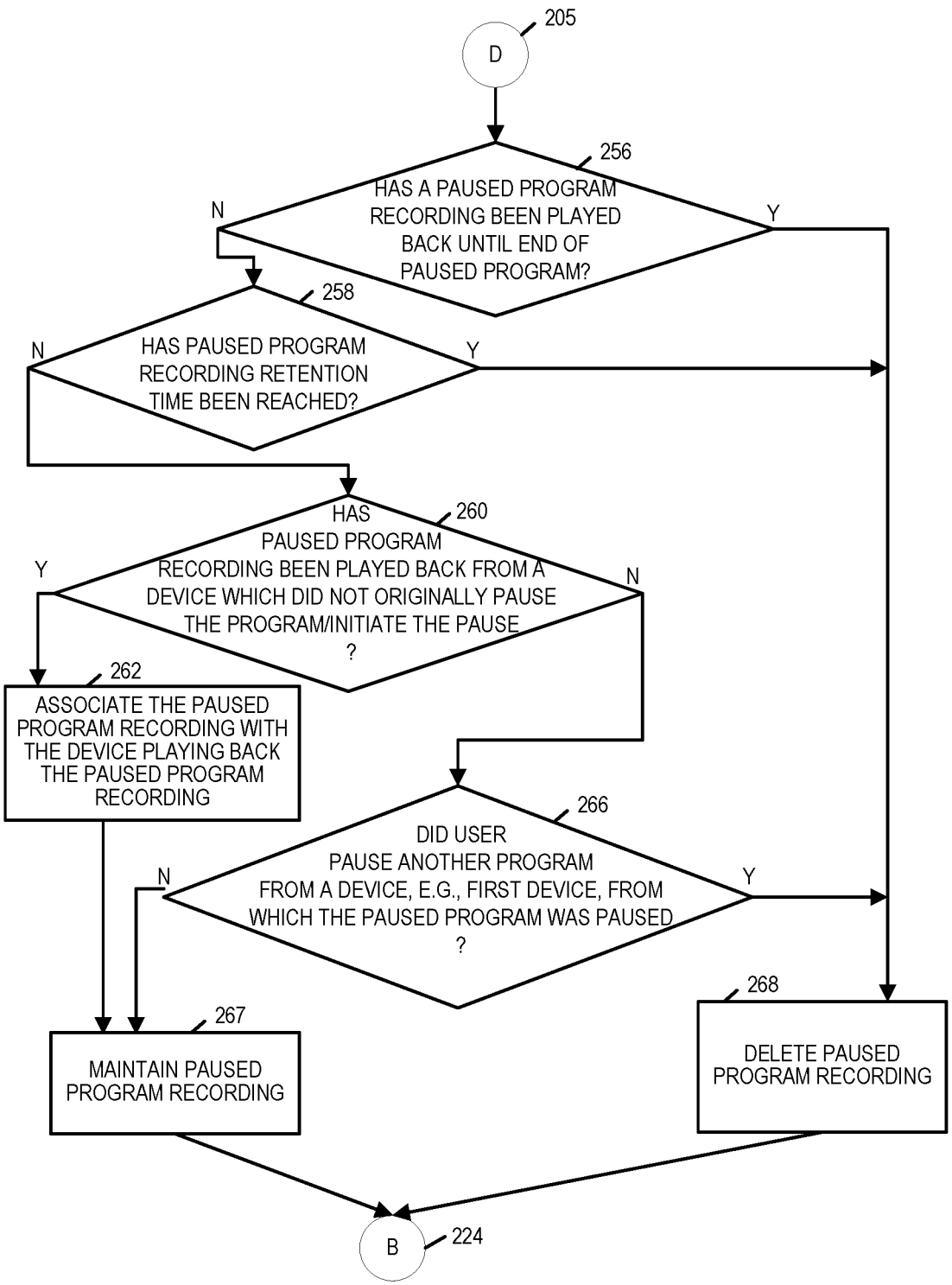
FIG. 2D is a fourth part of the exemplary method of operating a control device, in accordance with an exemplary embodiment.

Referring now to the steps performed along the path of node D 205 which are illustrated in FIG. 2D. The steps shown in FIG. 2D are performed in some embodiments as part of implementing a paused program recording maintenance routine which is performed, e.g., periodically at predetermined time intervals. The steps are performed to manage the recordings of paused programs on a per customer account basis and/or per device basis for devices associated with a customer account. In some embodiments each device associated with a customer account is allowed to implement one paused program recording, e.g., have one paused program recording. As will be discussed the steps of the paused program recording maintenance routine are performed in order to maintain the paused program recordings in the paused program storage or delete the recordings in accordance with the features of the present invention. Operation proceeds from step 202 to step 256 via connecting node D 205. In step 256 the control device determines whether a paused program recording, e.g., a recorded portion of a paused program, has been played back until end of the program, e.g., played back on at least one of the devices associated with a given a customer account. If it is determined that the paused program recording has been played back until end of the program the operation proceeds to step 268 where the control device deletes the recorded portion of the paused program from the paused program storage. It should be appreciated that in embodiments where a single device is restricted to one paused program recording, the deletion of paused program recording upon playback till the end, frees up the paused program storage for the particular device to which the paused program storage space was allocated. In various embodiments the paused program storage is different and separate from storage for user recorded programs. Operation proceeds from step 268 via connecting node B 224 back to steps 204 and 256.

If in step 256 it is determined that the paused program recording has not been played back until end of the program on at least one device associated with the given customer account the operation proceeds from step 256 to step 258. In step 258 it is determined whether a program retention time corresponding to the paused program recording has been reached. The retention time (also referred to as retention end time) for a paused program recording indicates a time until which the paused program recording, e.g. recorded portion of the paused program, will be maintained in the paused program storage, following completion of recording, given that other conditions are satisfied such as, e.g., playback of the recorded portion has not resumed and completed from at least one device, the device initiating the pause has not exited out of the pause mode etc. In terms of duration, a retention time period indicates a time period (from a time at which recording of the paused program started or finished) for which the paused program recording will be maintained, e.g., 24 hours in some embodiments. Thus in other words in step 258 it is determined if a retention time period associated with the recorded portion of the paused program has expired. For example a retention time for a paused program recording, e.g., Title1, may be identified as, e.g., Apr. 25, 2016 11:30 pm. This indicates that Title1 recording will be maintained until Apr. 25, 2016 11:30 pm (given other conditions are satisfied) and deleted after that. If a paused program recording retention policy is to maintain paused program recording for 24 hours the program recording may have started (or finished) e.g., at 11:30 on Apr. 24, 2016 giving a retention time period of 24 hours to user to playback. As should be appreciated depending on retention policy many variations are possible. In various embodiments the retention period for a user selected recording, e.g., recorded content that has been selected for recording by the user (not a paused program) is greater than the retention time period for paused program recordings. If in step 258 it is determined that the retention time period associated with the paused program recording has expired the operation proceeds to step 268 where the control device deletes the recorded portion of the paused program from the paused program storage. If in step 258 it is determined that the retention time has not been reached, e.g., retention time period associated with the paused program recording has not expired, the operation proceeds to step 260. In some embodiments the retention time for paused program content is different from the retention time for program content recorded as part of a user control DVR operation. Thus in some embodiments a user may have, and set, a separate pause retention time and DVR recording retention time. In some embodiments since the pause retention time is not counted against the DVR data recording limit, the user does not have control of the pause retention time while the user does have control over the DVR retention time. For example in one embodiment a fixed pause retention time is set to a first amount of time, e.g., 24 hours by the network control device 158 while the DVR retention time is set by a customer, e.g., playback device user to a user configurable value, e.g., 2 weeks, which is different from the pause retention time.

In step 260 a check is made to determine if the paused program recording has been played from a device which did not originally pause the program, e.g., device which did not initiate the pause. If it is determined that the paused program recording has been played from a device which did not originally pause the program the operation proceeds from step 260 to step 262 where the control device associates the paused program recording with the device playing back the paused program recording, e.g., the second device is a second device requested playback of content recorded due to a pause by another device, e.g., the first device. Thus in the embodiments where a single paused program recording is allowed per device, the paused program recording association is changed to the device that has been playing back the paused program recording, if different from the device that initiated the pause. It should be appreciated that doing so makes the paused program recording space available once again for the device that initiated the pause and does not unnecessarily hold up the space allocation for the pause initiating device once the playback has resumed from a different device. While in some embodiments a user is allowed to pause one program per device in other embodiments such a constraint does not exist. Operation proceeds from step 262 to step 267 where the control device decides to maintain the paused program recording and the paused program recording is maintained. Operation proceeds from step 267 via connecting node B 224 back to steps 204 and 256.

If in step 260 it is determined that the paused program recording has not been played from a device which did not originally pause the program the operation proceeds from step 260 to step 266. In step 266 the control device determines if a user paused another program from a device, e.g., first playback device, from which the pause was initiated and/or exited from the pause mode of operation, e.g., prior to playing back the paused program recording till the end of the program. If it is determined that another program has been paused from the device from which the pause was initiated and/or the device has exited out of the pause mode of operation (e.g., prior to playing back the paused program recording till the end of the program) the operation proceeds from step 266 to step 268 where the control device deletes the paused program recording. Thus pausing of a second program by a device which has a paused program already recorded and stored in some embodiments will result in deleting of the paused program if the program was not viewed via another device before the device which paused the program pauses a second program. In this way in the particular exemplary embodiment the number of paused recordings created for and maintained for a device maybe limited to one. Notably however, by changing the association of which device the paused recording is associated with when another device plays back paused content to the device playing back the content a user of the first device can resume normally use and pause functions without accidentally triggering deletion of the previously paused content being viewed on the second device.

In other embodiments the pause retention alone is used to limit the amount of recordings and multiple pause recordings attributable device maybe and are maintained with the recordings being removed at the end of the pause retention time rather than based on whether or not the device which triggered the pause pauses another program. If in step 266 it is determined that the user did not pause another program from the first device and/or the device has not exited out of the pause mode of operation the operation proceeds from step 266 to step 267 where the control device maintains the paused program recording. Operation proceeds from step 267 via connecting node B 224 back to steps 204 and 256.

FIG. 3 illustrates a paused program recordings table 300 in accordance with one embodiment of the invention. The paused program recordings table 300 includes a list of paused program portions that have been recorded, e.g., in paused program recording storage 162/162', for a given customer account. For the purposes of the illustrated example consider that there are K devices associated with the customer account. The date and time shown on the top right hand corner in table 300 indicates a current date and time, e.g., maintained by the control device. Some or all information shown in the table 300 may be displayed to a user on a display device in some embodiments, e.g., as part of pause information which may be displayed to a user of a playback device to allow the user to resume playback of one or more paused programs. In various embodiments the paused program recordings shown in table 300 are maintained by the control device 158 in accordance with the features of the present invention as discussed in the method of FIG. 2.

The first column 302 includes program/movie title information of paused program recordings which are available for an individual customer account. The second column 304 shows pause start time information indicating the time when pause was initiated and/or time at which recording of the paused program started. The third column 306 shows retention end time indicating the time until which a given paused program recording will be maintained. The fourth column 308 includes device information corresponding to the device which initiated a pause of a given program. Each of the rows 310, 312, . . . , 320 corresponds to an individual paused program recording identified by title in a corresponding entry in column 302. For a better understanding and appreciation of the information presented in table 300, the paused program recordings table 300 should be read row wise and with each row proceeding along the entries in different columns from left to right. Thus each row, when considered in combination with information included in a corresponding entry in each of the columns 302, 304, 306 and 308, provides a set of information for a given paused program recording.

Consider the first row 310 and the corresponding first entry in each of the columns 302, 304, 306 and 308. The first entry in column 302 identifies "TITLE 005" as the title/name of the recorded paused program content which may be, e.g., a movie, program, event etc. Next the corresponding entry in column 304 indicates Apr. 25, 2016 11:33 AM as the pause time, e.g., time at which pause was initiated, for "TITLE 005". Next the first corresponding entry in column 306 includes the retention time for paused program recording "TITLE 005" which is Apr. 26, 2016 11:33 AM indicating that the recorded portion of the paused program "TITLE 005" will be retained till 11:33 AM on Apr. 26, 2016. Finally the corresponding entry in column 308 identifies "device 2" as the device which initiated pause of "TITLE 005" and thus triggered recording of the paused program.

Next consider the second row 312 in a similar manner in combination with information included in the corresponding first entries in each of the columns 302, 304, 306 and 308. The corresponding entry in column 302 for the second row 312 identifies "TITLE 009" as the title/name of the recorded paused program content. Next the corresponding entry in column 304 indicates Apr. 24, 2016 9:20 PM as the pause time for the paused program recording "TITLE 009". Next the corresponding entry in column 306 indicates that the retention time for paused program recording "TITLE 009" is Apr. 25, 2016 9:20 PM. The corresponding entry in column 308 identifies "device 1", e.g., STB 110, as the device which initiated pause of "TITLE 009" and thus triggered recording of the paused program.

The remaining information in the table 300 may be read in a similar manner. Consider the last row 320 in combination with information included in the corresponding first entries in each of the columns 302, 304, 306 and 308. For row 320 the corresponding entry in column 302 identifies "TITLE N" as the title/name of the recorded paused program content. Next the corresponding entry in column 304 indicates Apr. 24, 2016 5:40 PM as the pause time for the paused program recording "TITLE N". Next the corresponding entry in column 306 indicates that the retention time for paused program recording "TITLE N" is Apr. 25, 2016 5:40 PM. The corresponding entry in column 308 identifies "device K" as the device which initiated pause of "TITLE N". In some embodiments each device associated with a customer account is allowed one paused program recording. The paused program recordings are stored in paused program recordings storage 162 separate from user selected program recordings. The memory space taken up by a paused program recording is not counted towards a customer's allocated storage assigned by the service provider which may be, e.g., 5 GB, 10 GB, 20 GB etc.

FIG. 4 illustrates a user selected program recordings table 400 in accordance with one embodiment of the invention. The user selected program recordings table 400 includes a list of content, e.g., programs, movies, shows, music, etc., that have been selected and recorded by a user associated with a given customer account. For the purposes of discussion consider that the paused programs recordings shown in table 300 and the user recorded programs shown in table 400 correspond to the same customer account. The date and time shown on the top right hand corner in table 400 indicates a current date and time, e.g., maintained by the control device. Some or all information shown in the table 400 may be displayed to a user on a display device in some embodiments, e.g., when a user requests display of user recorded items, e.g., "MY RECORDINGS". In various embodiments the user selected program recordings shown in table 400 are stored in a user recorded program storage 161 which is separate from the paused program storage 162.

The first column 402 of information table 400 includes program/movie title information of user recorded content which are available for an individual customer account. The second column 404 shows the recording date indicating the date when a given content item was recorded. Recording time information may also be included in some embodiments. The third column 406 shows retention end time indicating the time until which a given piece of recorded content will remain stored. In some embodiments the retention policy for retaining user recorded programs is different than retention policy for retaining paused program recordings. While many user recorded programs/movies may be available for indefinite time, e.g., for as long as the user wants, in some embodiments some of the user recordings which are, e.g., highly popular and/or new and/or obtained on-demand and/or have other access restrictions, may be retained for less time than other user recordings. For example a pay per view content that the user may have ordered and paid for may be available for recording but with the condition that the item will be retained for, e.g., only 7 days or 15 days. However other items may be recorded and retained for longer times, e.g., 6 months.

Consider the first row 410 and the corresponding first entry in each of the columns 402, 404 and 406. The first entry in column 402 identifies "TITLE 001" as the title/name of the user recorded program content which may be, e.g., a movie, program, event etc. Next the corresponding entry in column 404 indicates Apr. 20, 2016 as the date of recording of "TITLE 001". Next the first corresponding entry in column 406 includes the retention time for the recorded content "TITLE 001" which is May 5, 2016 12:00 AM indicating that the recorded content of "TITLE 005" will be retained till 12:00 AM on May 5, 2016. Upon expiration of the retention time the recorded content is deleted in various embodiments.

Next consider the second row 412 in a similar manner in combination with information included in the corresponding first entries in each of the columns 402, 404 and 406. The corresponding entry in column 402 for the second row 412 identifies "TITLE 002" as the title/name of the user recorded content. Next the corresponding entry in column 404 indicates Dec. 30, 2015 as the date of recording of "TITLE 002". Next the corresponding entry in column 406 shows the retention time for the recorded content "TITLE 002" as N/A for not applicable indicating that the recorded content will be retained indefinitely for as long as the user desires and thus will not be deleted unless the user deletes the recorded item. Consider the third row 414. The corresponding entry in column 402 for the third row 414 identifies "TITLE 003" as the title/name of the user recorded content. The corresponding entry in column 404 indicates Apr. 25, 2016 as the date of recording of "TITLE 003". Next the corresponding entry in column 406 shows the retention time for the recorded content "TITLE 003" as May 25, 2016 12:00 AM indicating that the recorded content "TITLE 003" will be retained till 12:00 AM on May 25, 2016.

The remaining information in the table 400 may be read in a similar manner. Consider the last row 420 in combination with information included in the corresponding first entries in each of the columns 402, 404 and 406. The corresponding entry in column 402 for row 420 identifies "TITLE M" as the title/name of the user recorded content. The corresponding entry in column 404 indicates Mar. 1, 2016 as the date of recording of "TITLE M". Next the corresponding entry in column 406 shows the retention time for the recorded content "TITLE M" as May 31, 2016 12:00 AM indicating that the recorded content "TITLE M" will be retained till 12:00 AM on May 31, 2016.

Figure 5:
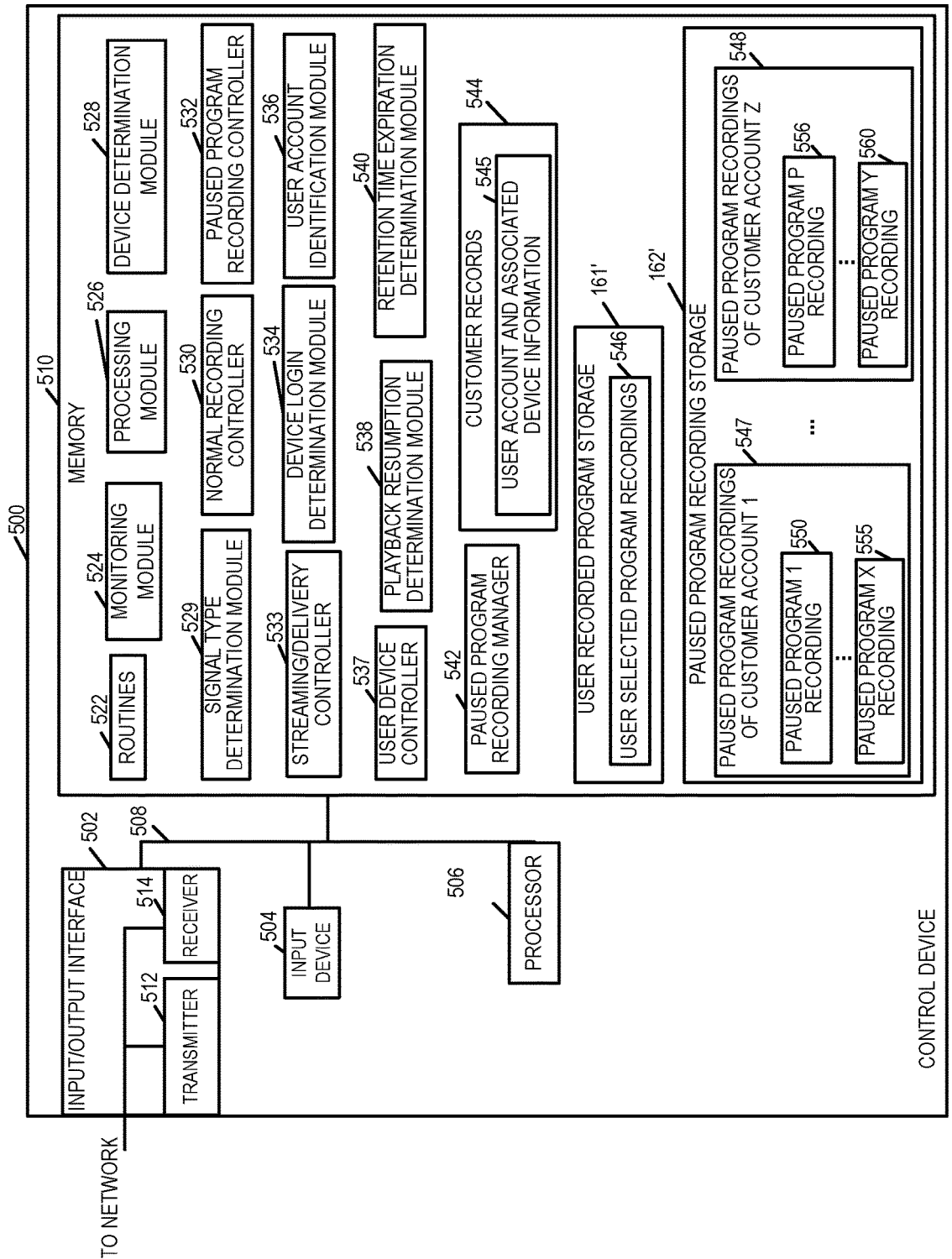
FIG. 5 illustrates an exemplary control device implemented in accordance with some exemplary embodiments.

FIG. 5 illustrates an exemplary control device 500 implemented in accordance with an exemplary embodiment. The exemplary control device 500 can be, and in some embodiments is, used as the control device 158 of FIG. 1. In some embodiments the control device 500 is implemented as a network device located in the network external to customer premises. In some embodiments the control device 500 is configured to implement at least some of the steps shown in the method of FIGS. 2A-2D. In accordance with one aspect the exemplary the control device 500 facilitates implementing multi-device pause functions in accordance with the invention.

As shown, the control device 500 includes an input/output (I/O) interface 502, an input device 504, a processor 506, and a memory 510 coupled together via a bus 508. The various components of the control device 500 can exchange data and information over the bus 508. The I/O interface 502 includes a transmitter 512 and a receiver 514. In some embodiments via the I/O interface 502 the control device 500 is coupled to the network interface 168 of the headend 102 via which information is communicated with the devices located at the customer premises over communications network 170. Furthermore via the I/O interface 502, the control device 500 can exchange signals and/or information with other devices and/or system elements such as the servers in the network headend 102 over the local network 166.

The input device 504 may be a keypad, touch screen, and/or other device for receiving and processing input commands/instructions. The processor 506, e.g., a CPU, executes control routines 522, uses one or more modules and stored information to control the control device 500 to operate in accordance with the invention and implement one or more steps of the method 200. Thus to control the operation of control device 500, the processor 506 uses information, various modules and/or routines including instructions stored in memory 510. In some embodiments the processor is configured to control various elements of the control device 500, e.g., such as the transmitter and receiver, to communicate and/or receive information in accordance with the invention.

In addition to the routines 522, the memory 510 includes a monitoring module 524, a processing module 526, a device determination module 528, a signal type determination module 529, a normal recording controller 530, a paused program recording controller 532, a streaming/delivery controller 533, a device login determination module 534, a user account identification module 536, a user device controller 537, a playback resumption determination module 538, a retention time expiration determination module 540, a paused program recording manager 542, customer records 544, user recorded program storage 161' and paused program recording storage 162'.

Routines 522 include communications routines and/or device control routines. The monitoring module 524 is configured to monitor for signals from other devices, e.g., customer premise devices located at customer premises as well as other devices at the headend or located externally. For example in various embodiments the monitoring module 424 monitors for control signals, e.g., pause, resume, channel selection, login etc., from one or more customer devices. The control device is configured to receive such signals and/or messages, e.g., via the receiver 514 of interface 502.

The processing module 526 is configured to process various received information and/or signals (e.g., control signals to implement a pause operation, resume playback etc., received by the control device 500 via the receiver 515 of interface 502, to recover information, e.g., instruction and/or request to take an action. In various embodiments the processing module 526 is configured to process the received messages and/or signals and provide recovered information to the processor 506 and/or one or more other modules to take further action in response to the received signals.

The device determination module 528 is configured to determine a device and/or device type from which a signal is received, e.g., based on device ID and/or other identification information included in a received signal and information corresponding to various devices stored in the control device 500. For example in some embodiments the device determination module 528 is configured to determine and/or identify a device from which a pause signal is received, in some embodiments the device determination module 528 is further configured to determine and/or identify a device from which a resume playback signal is received, e.g., to determine whether the resume playback is from the same device which initiated program pause or from a different device associated with the same customer account. In various embodiments such information is communicated in the control signals and/or determined based on stored information 545 about user account and associated device in combination with information communicated in the control signal from a device. The signal type determination module 529 is configured to determine a type of received signal, e.g., whether a received signal is a control signal, e.g., pause, resume, channel selection, login etc., or another type of signal. Based on the determination of the type of a received signal the signal type determination module is 529 provides information to one or more other modules of the control device 500 in order for proper handling of the instructions and/or other information received in the received signal.

The normal recording controller 530 is configured to control recording of user selected programs and manage storage of the user selected program recordings 546. The paused program recording controller 532 is configured to control recording of paused programs in response to the control device 500 receiving a pause signal from a customer device. In some embodiments the paused program recording controller 532 is configured to initiate, in response to the control device 500 receiving a pause signal, recording of a portion of a program, the program being a first program that was being output by a first playback device prior to initiation of a pause at the first playback device. The paused program recording controller 532 is further configured to control storage of the paused program recording, e.g., the recorded portion of the paused program, in the paused program storage corresponding to a device from which a pause signal was received, e.g., in a network storage for paused program recordings corresponding to the device and/or user account associated with the device from which pause signal was received.

The streaming/delivery controller 533 is configured to provide, in response to a resume playback signal from a customer device requesting paused program playback resumption to resume playback of a paused program, the recording of the paused program to the requesting device. In some embodiments the streaming/delivery controller 533 is configured to provide, in response to a resume playback signal from a second playback device to resume playback of a paused program, the recorded portion of the paused program to the second playback device. In some embodiments the second playback device is different from a first playback device which initiated the pause of the program. The device login determination module 534 is configured to determine if a device associated with a customer account is trying login to the customer account, e.g., via a device associated with the customer's account in order to access services, e.g., content streaming services. In some embodiments the device login determination module 534 makes such determination based on the type, format and/or information in a received login signal and based on stored customer account information 545. The device login determination module 534 is further configured to authenticate the device attempting to log in. In some embodiments the device login determination module 534 is further configured to determine if the device from which a login signal is received is operating in pause mode or normal mode of operation.

The user account determination module 536 is configured to identify customer account corresponding to a device from which a login signal was received, e.g., by mapping device identifier and/or login user name/password or other information to stored information 545.

The user device controller 537 is configured to control customer devices to perform actions, e.g., by sending command and/or control signals to the customer devices. For example in some embodiments the user device controller 537 is configured to control the control device 500 (or an element of the device 500 such as the transmitter 512) to send, in response to a received pause signal, a first switch control signal to the device from which pause signal was received, e.g. first playback device. In some embodiments the first switch control signal controls the first playback device to switch to a pause mode of operation, stop outputting the program, e.g., a first program, that was being output by the first playback device prior to initiation of pause, and display a pause indicator, e.g., on a display device. The display indicator in some embodiments includes a message indicating that the program has been paused and an option to resume playback. The user device controller 537 is further configured to control the control device 500 to send, in response to a resume playback signal from a device operating in pause mode of operation, e.g., first playback device, a second switch control signal to the first playback device to switch from the pause mode of operation to a normal playback mode of operation and output content supplied from recording of the paused program, e.g., a supplied recorded portion of the paused program. In some embodiments the control signal further control the device to continue outputting supplied content corresponding to the paused program recording until end of the program or until a new command is received, e.g., either from the control device 500 or a user controller such as a remote control. In some embodiments the second switch control signal further controls the first playback device to stop displaying the pause indicator being displayed while the first device was in pause mode of operation. In some embodiments the user device controller 537 is configured to control the control device 500 (e.g., via transmitter 514) to send a switch control to a device operating in pause mode, e.g., first device which initiated a pause, to switch to a normal playback mode of operation in response to a resume playback signal from another device, e.g., second playback device which is resuming playback of paused program.

In some embodiments, in response to a login signal from a customer device associated with a customer account which does not have any other associated device operating in the pause mode, the user device controller 537 is further configured to control the control device 500 to send a signal to the customer device from which a login signal was received to present a program content guide and/or that information normally presented to a user upon login. In some embodiments, in response to a login signal from a customer device associated with a customer account which has one or more other associated device operating in the pause mode, the user device controller 537 is further configured to control the control device 500 to send a signal to the customer device from which a login signal was received to present, e.g., on a display device, an opportunity to a user to resume playback of a paused program that was paused on a device associated with the same customer account. In some embodiments the signal includes pause information and controls the customer device from which a login signal was received to display a list of paused programs corresponding to the identified customer account.

In some embodiments, in response to a resume playback signal from a customer device, e.g., second playback device, to which pause information (e.g., list of paused programs corresponding to the associated customer account) is provided the user device controller 537 is further configured to control the control device 500 to send a signal (e.g., via transmitter 514) to the second playback device to resume playback of the paused program on the second device from which resume playback signal was received and output the recorded portion of the paused program being provided. In some such embodiments the second playback device is the device which did not initiate the program pause.

The playback resumption determination module 538 is configured to determine if playback of a paused program has resumed on a customer device to which paused program recording (recorded portion of the paused program) has been supplied. The playback resumption determination module 538 is configured to determine if the paused program recording has been played until end of the program. The retention time expiration determination module 540 is configured to determine if the retention time period for a recorded piece of content has expired, e.g., retention time associated with a paused program recording has been reached. The paused program recording manager 542 is configured to perform paused program recording maintenance functions in accordance with the features of the invention, e.g., by implementing the functions corresponding to various steps shown in FIG. 2D. Thus in various embodiments the paused program recording manager 542 decides which paused program recordings stored in storage 162' should be maintained or deleted and take other actions with regard to recording maintenance. In some embodiments playback resumption determination module 538 and the retention time expiration determination module 540 provide information to the recording manager 542 and/or work under the control of paused program recording manager 542. In some embodiments the paused program recording manager 542 is configured to determine if a paused program recording has been played back from a device which did not originally pause the program, e.g., which did not initiate the program pause. In some embodiments upon determining that a paused program recording is being played back from a device which did not originally pause the program the paused program recording manager 542 associates the paused program recording with the device playing back the paused program recording and maintains the paused program recording, e.g., until the program has been played back until end or retention time period expires.

In some embodiments the paused program recording manager 542 is configured to delete the paused program recording from the paused programs storage 162' when it is determined that the paused program recording has been played back until the end of the program. In some embodiments the paused program recording manager 542 is configured to maintain the paused program recording when it is determined that the paused program recording has not been played back until the end of the program. In some embodiments the paused program recording manager 542 is configured to delete the paused program recording from the paused programs storage 162' when it is determined that the retention time period corresponding to the paused program recording has expired. In some embodiments the paused program recording manager 542 is configured to maintain the paused program recording when it is determined that the retention time period has not expired. In some embodiments the paused program recording manager 542 is configured to delete the paused program recording from the paused programs memory portion when it is determined that at least one of the following is true: i) has resumed from said second playback device and said program has been played back until the end of said program, or ii) the first retention time period has expired. In some embodiments when at least one of the two conditions is not true the paused program recording manager 542 is configured to maintain the paused program recording.

In some embodiments the paused program recording manager 542 is configured to determine if a user paused another program from a device, e.g., first playback device, from which a pause was initiated and/or if the pause initiating device exited from the pause mode of operation, e.g., prior to playing back the paused program recording till the end of the program. In some embodiments if it is determined that another program has been paused from the device from which the pause was initiated and/or the device has exited out of the pause mode of operation e.g., prior to playing back the paused program recording till the end of the program, the paused program recording manager 542 is configured to delete the paused program recording. If it is determined that the user did not pause another program from the pause initiating device (e.g., first device) and/or the device has not exited out of the pause mode of operation the paused program recording manager 542 is configured to maintain the paused program recording in the storage 162'.

The stored information includes customer records 544 corresponding to a plurality of customers served by the headend 102. Each customer record in the customer records 544 correspond to an account holder/subscriber and includes user account and associated devices information 545 with the given customer account. The user recorded programs storage 161' is the storage including user recorded programs 546 for a plurality of customers. The user recorded programs 546 include user selected program recordings on a per customer account basis for the plurality of customers.

The paused program recording storage 162' is the storage for paused program recordings and includes paused program recordings for a plurality of customers on a per customer account basis. As shown the paused program recording storage 162' includes paused program recordings for customer account 1 547 to program recordings for customer account Z 548. The paused program recordings for customer account 1 547 includes the paused program recordings for customer account 1, e.g., recorded portion of programs paused by devices associated with customer account 1. The paused program recordings included in the paused program recordings for customer account 1 547 may be on a per device basis with each device associated with customer account 1 being allowed to maintain one recording. Thus in some embodiments the paused program recordings for customer account 1 547 includes, at the most, as many paused program recordings as the number of devices associated with the customer account 1. In the example of FIG. 5 the paused program recordings for customer account 1 547 includes paused program 1 recording 550, e.g., recorded portion of a program 1 that has been paused, through paused program X recording 555, e.g., recorded portion of a program X that has been paused. The paused program 1 recording 550 is associated with a device that initiated the pause, e.g., a first playback device, while paused program X recording 555 is associated with another device that initiated the pause, e.g., a device different from the first device.

Similarly the paused program recordings for customer account Z 548 includes, at the most, as many paused program recordings as the number of devices associated with the customer account Z. In the example of FIG. 5 the paused program recordings for customer account X 548 includes paused program P recording 556, e.g., recorded portion of a program P that has been paused, through paused program Y recording 560, e.g., recorded portion of a program Y that has been paused. The paused program P recording 556 is associated with a device (corresponding to customer account Z) that initiated the pause of program P while paused program Y recording 560 is associated with another device that initiated the pause of program Y.

While shown as being included in memory 510 of the control device 500, in some embodiments the customer records 544 including information 545, the user recorded program storage 161' and the paused program recording storage 162' are located external to the control device 500, e.g., with the customer records 544 being in the customer database 160 and storages 161', 162' being part of the content storage 156. In such embodiments the information included in the customer database 160 and storages 161', 162' can be accessed and retrieved by the control device 500. Thus the user recorded program storage 161' and the paused program recording storage 162' are the same or similar to the user recorded program storage 161 and the paused program recording storage 162 stored in content storage 156. In some embodiments the paused programs are recorded by the control device 500 and first temporarily stored in the paused program recording storage 162' prior to being transferred to paused program recording storage 162 in the content storage.

In some embodiments the modules shown in FIG. 5 are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

While shown in FIG. 5 example to be included in the memory 510, the modules shown included in the control device 500 can, and in some embodiments are, implemented fully in hardware within the processor 506, e.g., as individual circuits. The modules can, and in some embodiments are, implemented fully in hardware, e.g., as individual circuits corresponding to the different modules. In other embodiments some of the modules are implemented, e.g., as circuits, within the processor 506 with other modules being implemented, e.g., as circuits, external to and coupled to the processor 506. As should be appreciated the level of integration of modules on the processor and/or with some modules being external to the processor may be one of design choice. Alternatively, rather than being implemented as circuits, all or some of the modules may be implemented in software and stored in the memory 510 of the control device 500, with the modules controlling operation of the control device 500 to implement the functions corresponding to the modules when the modules are executed by a processor, e.g., processor 506. In still other embodiments, various modules are implemented as a combination of hardware and software, e.g., with another circuit external to the processor providing input to the processor 506 which then under software control operates to perform a portion of a module's function.

While shown in the FIG. 5 embodiment as a single processor, e.g., computer, it should be appreciated that the processor 506 may be implemented as one or more processors, e.g., computers. When implemented in software the modules include code, which when executed by the processor 506, configure the processor 506 to implement the function corresponding to the module. In embodiments where the various modules shown in FIG. 5 is stored in the memory 510, the memory 510 is a computer program product comprising a computer readable medium comprising code, e.g., individual code for each module, for causing at least one computer, e.g., processor 506, to implement the functions to which the modules correspond. Completely hardware based or completely software based modules may be used. However, it should be appreciated that any combination of software and hardware, e.g., circuit implemented modules may be used to implement the functions. As should be appreciated, the modules illustrated in FIG. 5 control and/or configure the control device 500 or elements therein such as the processor 506, to perform the functions of corresponding steps illustrated and/or described in the earlier discussed figures which are performed as part of the exemplary method of operating the control device 500 in accordance with the invention.

In one exemplary embodiment the processor 506 is configured to: process a pause signal received by the receiver 514 from a first playback device; initiate, in response to receiving the pause signal, recording of a portion of a program, the program being a first program that was being output by the first playback device prior to initiation of a pause by the first playback device; and control the transmitter 512 to transmit, in response to a resume playback signal from a second playback device to resume playback of the program, the portion of the program that has been recorded to the second playback device, the portion of the program that has been recorded being a recorded portion of the program, the second playback device being different from the first playback device.

In some embodiments the processor 506 is further configured to: detect a user login to a customer account from the second playback device; and control the transmitter to send a control signal to the second playback device, in response to detecting a user login to the customer account from the second playback device, to present an opportunity to a user of the second playback device to resume playback of a paused program. In some embodiments the user login is detected and the opportunity to resume playback is provided prior to the processor 504 controlling the transmitter 512 to provide the recorded portion of the program to the second playback device.

In some embodiments the processor 506 is further configured to: determine if playback of the program has resumed from the second playback device and the program has been played back until the end of the program; and delete the recorded portion of the program from a paused programs storage when it is determined that playback of the program has resumed from the second playback device and the program has been played back until the end of the program. In some embodiments the processor 506 is further configured to: determine if a first retention time period associated with the recorded portion of the program that has been recorded has expired; and delete the recorded portion of the program from a paused programs storage when it is determined that the first retention time period has expired.

In some embodiments the processor 506 is further configured to: determine if playback of the program has resumed from the second playback device and the program has been played back until the end of the program; determine if a first retention time period associated with the recorded portion of the program has expired; and delete the portion of the program from the paused programs memory portion when it is determined that at least one of the following is true: i) playback of the program has resumed from the second playback device and the program has been played back until the end of the program, or ii) the first retention time period has expired.

In some embodiments the processor 506 is further configured to: control the transmitter to send, in response to receiving the pause signal, a switch control signal to the first playback device, the switch control signal controlling the first playback device to switch to a pause mode of operation and output a pause indicator. In some embodiments the processor 506 is further configured to: control the transmitter to send, in response to the resume playback signal from the second playback device, a control signal to the first playback device to switch from a pause mode of operation to a normal playback mode of operation.

In some embodiments the recorded portion of the program is stored in a paused programs storage which is separate and different from a user selected recordings storage that stores user selected program recordings. In some embodiments the first retention time period is a time period for which the portion of the program that was recorded is retained in a paused programs storage. In some embodiments the first retention time period is shorter than a second retention time period for which a user selected recording is retained in a user selected recordings storage.

In some embodiments the program is a program which was being supplied to the first playback device via a broadcast. In some embodiments the processor is configured to record remaining portion of the broadcast, as part of being configured to initiate recording of the portion of the program in response to receiving the pause signal.

In some embodiments the opportunity to resume playback of a paused program includes a list of paused programs for which playback can be resumed. In some embodiments the paused program is one of a plurality of programs that have been paused from different devices associated with a customer account. In some embodiments the first playback device and the second playback device are associated with the same customer account.

These are just some examples to facilitate understanding of some of the many various embodiments supported by the methods and apparatus of the invention and are not intended to be limiting in nature. Various embodiments have been discussed above. It should be appreciated that the invention is not intended to be limited by the exemplary embodiments which are to facilitate an understanding of the invention and its many possible applications.

In various embodiments system elements described herein are implemented using one or more modules which are used to perform the steps corresponding to one or more methods of the present invention, for example, receiving control signal, e.g., pause signal, from a first device, initiating recording of a paused program and providing the recorded portion of the paused program to a second device. In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of supporting a multi-device pause function, comprising:
   receiving, at a control device, a pause signal from a first playback device;
   initiating, in response to receiving said pause signal, recording of a portion of a program, said program being a first program that was being output by said first playback device prior to initiation of a pause at said first playback device;

receiving, at the control device a resume playback signal from a second playback device;

determining, at the control device, if the resume playback signal is from a device to which pause information was provided, said second playback device being a different playback device than said first playback device and being a device to which pause information was provided; and sending, in response to determining that the resume playback signal is from a device to which pause information was provided, a control signal from the control device to said first playback device, to switch from a pause mode of operation to a normal playback mode of operation.

2. The method of claim 1, wherein said pause information is a list of paused programs;

wherein the pause signal is sent by the first playback device due to a user initiating a pause; and wherein said first playback device and second playback device are different devices associated with a customer account corresponding to the user, and wherein said user uses the first playback device to implement said pause and uses said second playback device to resume playback.

3. The method of claim 2, wherein an opportunity to resume playback of a paused program includes a list of paused programs for which playback can be resumed.

4. The method of claim 2, wherein said paused program is one of a plurality of programs that have been paused from different devices associated with a customer account.

5. The method of claim 1, wherein the first and second playback devices are different playback devices corresponding to the same user, the method further comprising;

providing to the second playback device, in response to the resume playback signal from the second playback device, said portion of said program that has been recorded.

6. The method of claim 5, further comprising:

sending, in response to receiving the pause signal, a switch control signal to said first playback device, said switch control signal controlling said first playback device to switch to a pause mode of operation and output a pause indicator.

7. The method of claim 5, further comprising:

determining if playback of said program has resumed from said second playback device and said program has been played back until the end of said program; and deleting said recorded portion of the program from a paused programs storage when it is determined that playback of said program has resumed from said second playback device and said program has been played back until the end of said program.

8. The method of claim 1, further comprising:

determining if a first retention time period associated with said recorded portion of said program that has been recorded has expired; and deleting said recorded portion of the program from a paused programs storage when it is determined that said first retention time period has expired.

9. The method of claim 8, wherein said first retention time period is a time period for which said portion of the program that was recorded is retained in a paused programs storage; and wherein said first retention time period is shorter than a second retention time period for which a user selected recording is retained in a user selected recordings storage.

10. The method of claim 1, further comprising:

sending, in response to receiving the pause signal, a switch control signal to said first playback device, said switch control signal controlling said first playback device to switch to a pause mode of operation and output a pause indicator.

11. The method of claim 1, wherein said pause information is a list of paused programs.

12. The method of claim 1, wherein said program is a program which was being supplied to the first playback device via a broadcast; and wherein initiating, in response to receiving said pause signal, recording of said portion of the program includes recording remaining portion of said broadcast.

13. The method of claim 1, wherein said first playback device and said second playback device are associated with the same customer account.

14. A control device, comprising:

a transmitter;

a receiver configured to receive signals from other devices; and a processor configured to:

process a pause signal received by said receiver from a first playback device;

initiate, in response to receiving said pause signal, recording of a portion of a program, said program being a first program that was being output by said first playback device prior to initiation of a pause at said first playback device;

receive a resume playback signal from a second playback device;

determine if the resume playback signal is from a device to which pause information was provided, said second playback device being a different playback device than said first playback device and being a device to which pause information was provided; and control said transmitter to transmit, in response to determining that the resume playback signal is from a device to which pause information was provided, a control signal to the first playback device to control the first playback device to switch from a pause mode of operation to a normal playback mode of operation.

15. The control device of claim 14, wherein said processor is further configured to:

detect a user login to a customer account from said second playback device; and control said transmitter to send a control signal to said second playback device, in response to detecting a user login to said customer account from said second playback device, to present an opportunity to a user of said second playback device to resume playback of a paused program.

16. The control device of claim 14, wherein said processor is further configured to:

determine if playback of said program has resumed from said second playback device and said program has been played back until the end of said program; and delete said recorded portion of the program from a storage device when it is determined that playback of said program has resumed from said second playback device and said program has been played back until the end of said program.

17. The control device of claim 14, wherein said processor is further configured to:
   determine if a first retention time period associated with said recorded portion of said program that has been recorded has expired; and
   delete said recorded portion of the program in a storage device when it is determined that said first retention time period has expired.

18. The control device of claim 14, wherein said processor is further configured to: determine if playback of said program has resumed from said second playback device and said program has been played back until the end of said program;
   determine if a first retention time period associated with said recorded portion of said program has expired; and
   delete said portion of the program from the paused programs memory portion when it is determined that at least one of the following is true: i) playback of said program has resumed from said second playback device and said program has been played back until the end of said program, or ii) the first retention time period has expired.

19. The control device of claim 14, wherein said processor is further configured to:
   control said transmitter to send, in response to receiving said pause signal, a switch control signal to said first playback device, said switch control signal controlling said first playback device to switch to a pause mode of operation and output a pause indicator.

20. The control device of claim 14, wherein said processor is further configured to:
   control said transmitter to send, in response to said resume playback signal from the second playback device, at least a portion of the recorded program.

* * * * *